United States Patent [19]

Welch, Jr. et al.

[11] Patent Number: 5,357,241
[45] Date of Patent: Oct. 18, 1994

[54] FAIL-SAFE LEAK DETECTOR

[76] Inventors: James G. Welch, Jr., Rte. 2, Box 333, Carencro, La. 70520; James W. Simmons, Rte. 1, Box 1080, Cotter, Ark. 72626; Demetrius Vassiliou, 3420 Clearmount Ave., Odessa, Tex. 79762

[21] Appl. No.: 61,748

[22] Filed: May 17, 1993

Related U.S. Application Data

[62] Division of Ser. No. 739,467, Aug. 2, 1991, Pat. No. 5,229,750.

[51] Int. Cl.$^5$ .......................................... G06B 21/00
[52] U.S. Cl. .................................. 340/605; 340/603; 200/61.05; 73/40
[58] Field of Search .................. 340/603, 604, 605; 122/504, 507; 126/374; 137/551; 73/304 R, 308, 40

[56] References Cited

U.S. PATENT DOCUMENTS

| | | | |
|---|---|---|---|
| 1,912,798 | 6/1933 | Sickels | 340/632 |
| 3,200,388 | 8/1965 | Ullig | 340/604 |
| 4,136,823 | 1/1979 | Kullberg | 237/8 R |
| 4,227,190 | 10/1980 | Kelley et al. | 340/604 |
| 4,264,902 | 4/1981 | Miller | 340/604 |
| 4,374,379 | 2/1983 | Dennison, Jr. | 340/604 |
| 4,488,567 | 12/1984 | Grant | 177/78.1 |
| 4,490,715 | 12/1984 | Kusanagi et al. | 340/634 |
| 4,630,038 | 12/1986 | Jordan | 340/632 |
| 4,677,371 | 6/1987 | Imuzumi | 324/52 |
| 4,745,399 | 5/1988 | Kimura | 340/521 |
| 4,788,529 | 11/1988 | Lin | 340/521 |
| 4,805,662 | 2/1989 | Moody | 137/312 |
| 4,819,551 | 4/1989 | Vole | 98/42.04 |
| 4,845,472 | 7/1989 | Gordon et al. | 340/605 |
| 4,916,437 | 4/1990 | Gazzoz | 340/632 |
| 4,944,253 | 7/1990 | Bellofatto | 137/312 X |
| 4,987,408 | 1/1991 | Barron | 340/604 |
| 5,229,750 | 7/1993 | Welch, Jr. et al. | 340/605 |

FOREIGN PATENT DOCUMENTS

| | | |
|---|---|---|
| 2601453 | 7/1987 | France . |
| 59-170644 | 3/1983 | Japan . |
| 60-2038 | 10/1985 | Japan . |
| 149927A | 8/1987 | Japan . |
| 915777 | 1/1963 | United Kingdom . |
| 2202358 | 9/1988 | United Kingdom . |

*Primary Examiner*—Jeffery A. Hofsass
*Attorney, Agent, or Firm*—Reginald F. Roberts, Jr.

[57] ABSTRACT

A fail-safe system for the detection of water leaks, and for the prevention of damage therefrom. In a home or building which includes a hot-water tank and a water tank for a toilet, e.g., the damage-prevention system comprises valves for shutting off the supply of water to the tanks, and other valves for draining the tanks through discharge lines to the outside of the home or building. At the same time, power to the hot-water tank is shut off. A fail-safe water detector comprises a float with a metal cap, a first pair of electrical probes below the float, and a second pair of electrical probes above the metal cap and separated from the cap by an air gap. A circuit is closed in any of three ways: (1) when water contacts the first pair of probes, (2) when water raises the float and makes contact between the metal cap and the second pair of probes, and (3) when water contacts the second pair of probes.

6 Claims, 6 Drawing Sheets

FAIL-SAFE LEAK DETECTOR

This is a division of application Ser. No. 739,467, filed Aug. 2, 1991, now U.S. Pat. No. 5,229,750.

BACKGROUND OF THE INVENTION

The present invention relates to the prevention of damage to homes or buildings from water leakage. More particularly, the invention relates to the fail-safe detection and prevention of such damage by independent and iterative means.

The prior art provides a number of systems for the prevention of water damage to the interior of homes and buildings. None of the prior art, however, alone or in combination, provides for (a) drainage of a leaking water tank to the external environment in response to the detection of a water leak from the tank, and (b) iterative and independent means for the detection of the leak. These needs are met and these problems solved by the apparatus and method of the present invention.

If water contained in a leaking tank is not drained to the outside of the building or home, substantial water damage may result even if and when the leak has been stopped by shutting off the supply of water to the tank.

If only one unitary sensor is available for leak detection, the sensor may fail and the leak continue unabated. If only one sensor is available for one tank, and if a second tank springs a leak, the water damage from the second leaking tank could result in considerable water damage. The use of a single sensor for both tanks would not solve this problem, since each tank would require its own sensor in order not to have both tanks emptied in response to a leak from only one of the tanks.

SUMMARY OF THE INVENTION

In general, the present invention in one aspect provides a fail-safe hot-water tank. The hot-water tank comprises a tank for holding water, thermostatted means for heating the contained water, a source for supplying water to the tank, and a first passageway from the source of water to the tank. A first valve keeps the first passageway open in the absence of detection of a water leak, and keeps the first passageway closed in response to the detection of a water leak from the tank. Means are provided for closing the first valve in response to the detection of a water leak from the tank, thereby shutting off the supply of water to the tank. A second valve is provided for draining water from the tank to the external environment in response to the detection of a water leak from the tank. The water is drained from the tank through a second passageway connecting the second valve to the external environment. Means are provided for disconnecting the thermostatted heating means in response to the detection of a water leak from the tank, thereby discontinuing the heating of the contained water. Means are further provided for detecting leakage of water from the tank.

In a second aspect, the present invention provides a fail-safe water tank for a toilet. The fail-safe water tank comprises a tank for containing water, a source for supplying water to the tank, a first passageway from the source of water to the tank, and flow-control means for keeping the water in the tank at a constant level. A first valve keeps open the first passageway in the absence of detection of a water leak from the tank, and keeps the passageway closed when a leak from the tank is detected. Means are provided for closing the first valve in response to the detection of a water leak from the tank, thereby shutting off the supply of water to the tank. A second valves drains the tank to the external environment in response to the detection of a water leak from the tank. The tank is drained through a second passageway running from the second valve to the external environment. Means are provided for detecting leakage of water from the tank.

In a third aspect, the invention provides a fail-safe electrical sensor for detecting a water leak, when the sensor is connected to a source of electricity. The sensor comprises a float having an electrically-conductive top and means for signalling a closed electrical circuit. A first pair of electrical conductors is disposed below the float and electrically connected to the source of electricity. A second pair of electrical conductors are disposed directly above and spaced apart from the float's conductive top, and are electrically connected to the source of electricity. The first and second pairs of conductors are connected in parallel to the source of electricity. The individual conductors of each pair of conductors are spaced apart from one another to provide an open circuit in the absence of the detection of a water leak. The distance separating the individual conductors of the second pair of conductors is less than the width of the electrically-conductive top of the float, to provide an open circuit in the absence of the detection of a water leak. A first electrical contact is made by water contacting the first pair of electrical conductors, thereby closing a first circuit and producing a first signal. As a first fail-safe feature of the invention, a second electrical contact would be made by rising water raising the float to a level at which electrical contact is made between the second pair of electrical conductors and the electrically-conductive top of the float, thereby closing a second circuit and producing a second signal. In a second fail-safe feature of the invention, a third electrical contact would be made by rising water contacting the second pair of electrical conductors, thereby closing a second circuit and producing the second signal.

In a fourth aspect, the invention provides a fail-safe system for preventing water damage to a building or home which includes a hot-water tank and a water tank for a toilet. The hot-water tank includes a first tank for holding water, thermostatted means for heating the water contained in the first tank, a source for supplying water to the first tank, and a first passageway from the source of water to the first tank. The water tank for the toilet includes a second tank for containing water, a source for supplying water to the second tank, and a second passageway from the source of water to the second tank. The damage-prevention system comprises a first valve for keeping open the first passageway from the source of water to the first tank, in the absence of the detection of a leak from the first tank. Means are provided for closing the first valve in response to the detection of a water leak from the first tank, thereby shutting off the supply of water to the first tank. A second valve is provided for draining the first tank to the external environment in response to the detection of a water leak from the first tank. A third passageway conducts the water from the second valve to the external environment. Means are provided for disconnecting the thermostatted heating means in response to the detection of a water leak from the first tank, thereby discontinuing the heating of the first tank. Means are provided for detecting a water leak from the first tank. A third valve keeps open the second passageway from the source of water to the second tank, in the absence of detection of a water leak from the second tank. When a water leak from the second tank is detected, the third valve closes, thereby shutting off the supply of water to the second tank. When a water leak from the second tank is detected, a fourth valve drains the second tank to the external environment through a fourth passageway extending from the fourth valve to the external environment. Means are provided for detecting a water leak from the second tank.

DETAILED DESCRIPTION OF THE INVENTION

Figure 1:
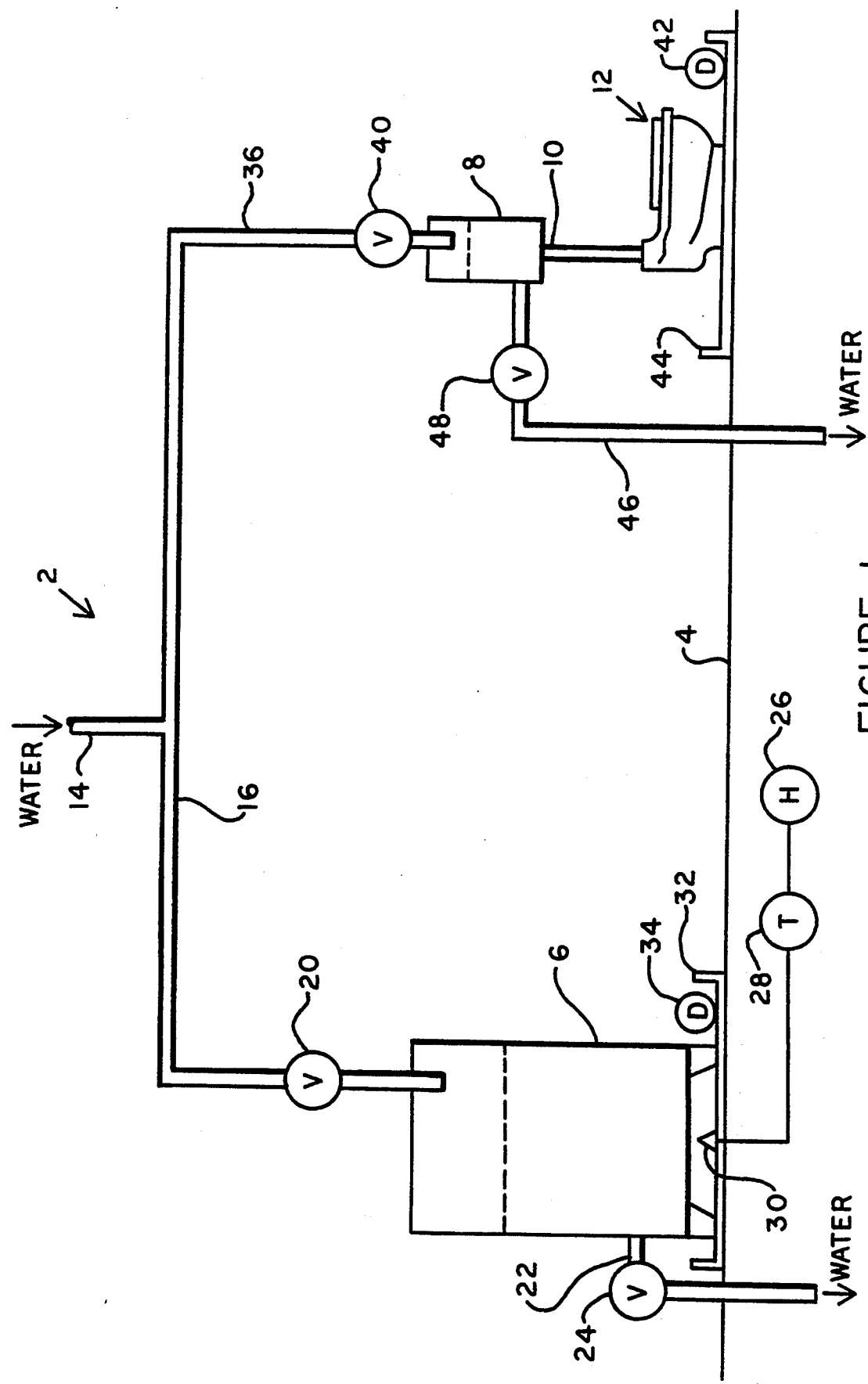
FIG. 1 is a schematic representation of a first assembly for preventing water damage due to water leaks in a home or building, the assembly being made in accordance with the principles of the present invention.

Reference is made to FIG. 1, wherein is shown the essential components of a first embodiment of a home-protection system made in accordance with the principles of the present invention, and designated generally by the numeral 2.

The system 2 comprises a floor 4 on which are disposed a hot-water tank 6 and a cold-water tank 8 which supplies water through a water-line 10 to a toilet 12.

The hot and cold-water tanks 6 and 8 are supplied with water from and by a water-main 14. From the water-main 14 water flows to the hot-water tank 6 through a water-line 16. A first solenoid valve 20 in the line 16 remains open except when a leak from the tank 6 is detected, whereupon the valve 20 closes and stops the flow of water to the tank 6.

The hot-water tank 6 is provided with a discharge line 22 running outside of the house or building (not shown) in which the system 2 is installed. A second solenoid valve 24 in the line 22 remains closed unless a water leak from the tank 6 is detected, whereupon the valve 24 opens to discharge water through the line 22 to the external environment.

The hot-water tank 6 is heated by gas or by electricity with a heater controlled by a thermostat 28. If gas heat is used, the tank 6 is heated by a flame 30.

A container 32 is disposed below the hot-water tank 6 to catch and hold any water which leaks from the tank. A first water-detector 34 is disposed in the container 32. When the detector 34 senses a leak from the tank 6, the detector produces an electrical signal which (a) closes the first valve 20, shutting off the supply of water to the tank 6; (b) opens the second valve 24, draining the water contained in the tank; and (c) shuts off electrical and/or gas power to the heater 26, thereby shutting off the heat supply to the tank 6.

Turning now to the cold-water tank 8, this tank is supplied with water from the main 14 through a line 36 in which is disposed a third solenoid valve 40. Like the first solenoid valve 20, the third solenoid valve 40 remains open unless a water leak from the tank 8 is detected by a second detector 42 disposed below the tank 8 in a second container 44. When a leak is detected, the second detector 42 produces a signal which (a) shuts off the water supply to the tank 8 by closing the valve 40, and (b) drains the tank 8 to the external environment through a second discharge line 46 by opening a fourth solenoid valve 48.

Other water-detectors (not shown) may beneficially be disposed throughout the home or building; e.g., detectors for sinks, bathtubs, and additional toilet tanks. Such additional detectors would function in the same manner as the second detector 42. If a second hot-water tank is included in the home or building, another detector similar to the first detector 34 would be used therefor.

Figure 2:
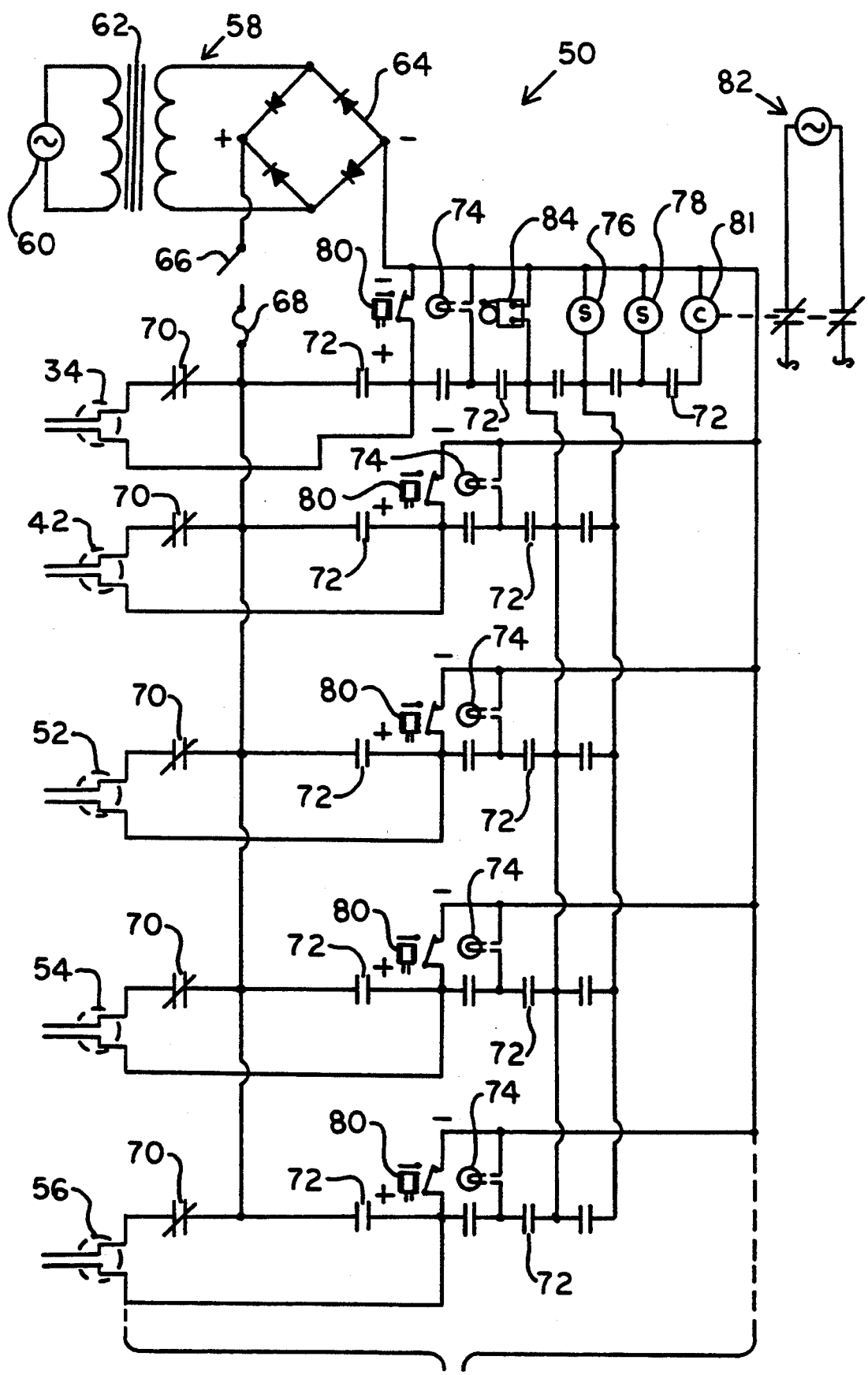
FIG. 2 is a schematic wiring diagram for the assembly shown in FIG. 1, in accordance with the principles of the present invention.

Reference is now made to FIG. 2, in which is shown a wiring diagram for five water-detectors, the wiring diagram being made in accordance with the principles of the present invention and generally designated by the numeral 50.

The wiring diagram 50 comprises first, second, third, fourth, and fifth water-detectors numbered 34, 42, 52, 54, and 56, respectively. The detectors 34, 42, 52, 54, and 56 are connected to a source of electrical power, generally designated by the numeral 58.

The electrical source 58 preferably includes a one-hundred-fifteen to two-hundred-thirty volt alternating current (115–230 VAC) source 60, a transformer 62, and a full-wave bridge rectifier 64. The transformer 62 and rectifier 64 convert the 115 VAC current into twenty-eight volt direct current (28 VDC).

The rectifier 64 is connected to the five water-detectors by an on-off switch 66 and a fuse 68. Each detector is provided with an individual, independent relay circuit connected in parallel to the rectifier 64. The voltage drop across the rectifier 64 is approximately three volts.

Each relay circuit includes a relay 80, a normally-closed electrical contact 70, a plurality of normally-open contacts 72, and an incandescent lamp 74. Each relay 80, solenoid 76, and solenoid 78 also includes a coil (not shown).

The circuit for the first water-detector 34 further includes an audible alarm 84, a coil 81, two solenoids 76 and 78, and a second normally-closed contact 70 connected to a source of electrical power 82 for the thermostat 28, and, if the heater 26 is electric, for the heater 26. The coil 81 controls the second normally-closed contact 70 of the isolated AC circuit 82.

The solenoids 76 (FIG. 2) operate to keep the first and third solenoid valves 20 and 40 (FIG. 1) open when the relay circuits for the first and second water-detectors 34 and 42 are open, and to close the first and third solenoid valves 20 and 40 when the relay circuits for the first and second detectors 34 and 42 are closed. The solenoids 78 (FIG. 2) keep the second and fourth solenoid valves 24 and 48 (FIG. 1) closed when the relay circuits for the first and second detectors 34 and 42 are open, and open the second and fourth solenoid valves 24 and 48 when the circuits for the first and second solenoid valves 34 and 42 are closed.

Figure 3:
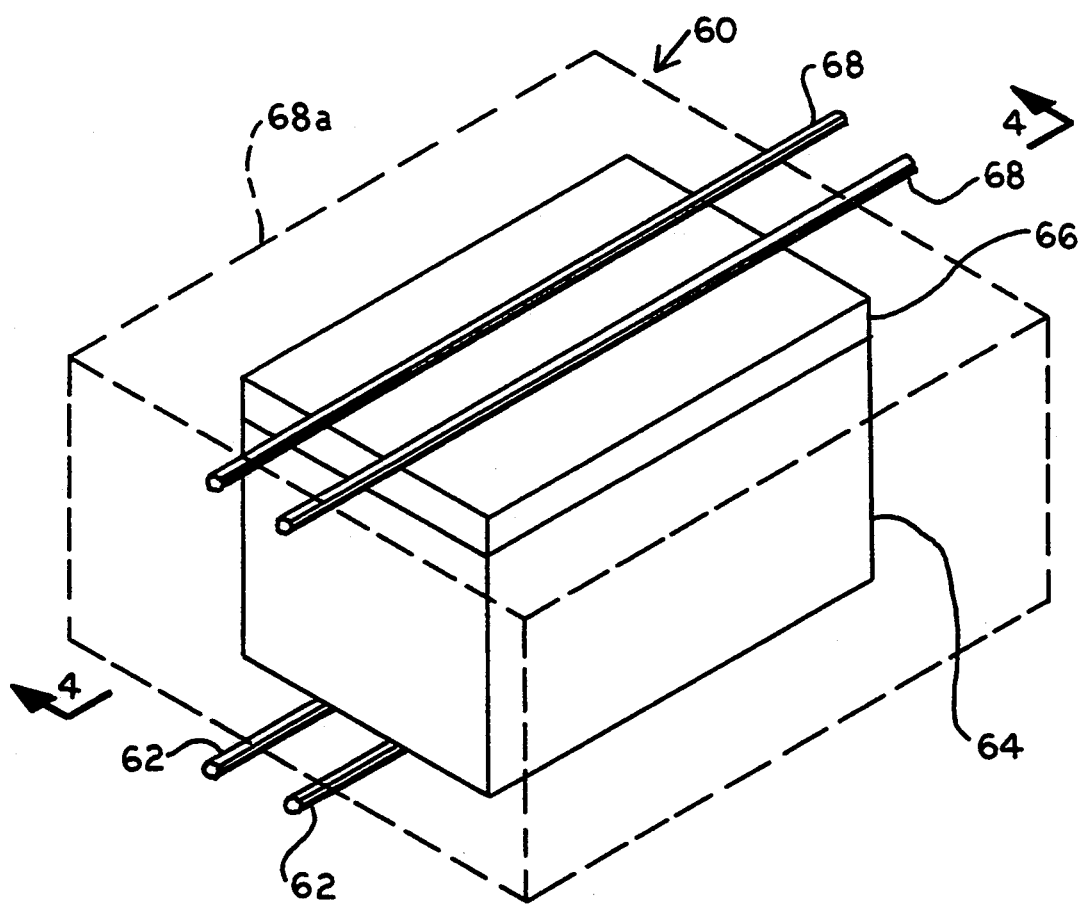
FIG. 3 is a schematic representation of a water-leak detector, made in accordance with the principles of the present invention, shown in perspective.
Figure 4:
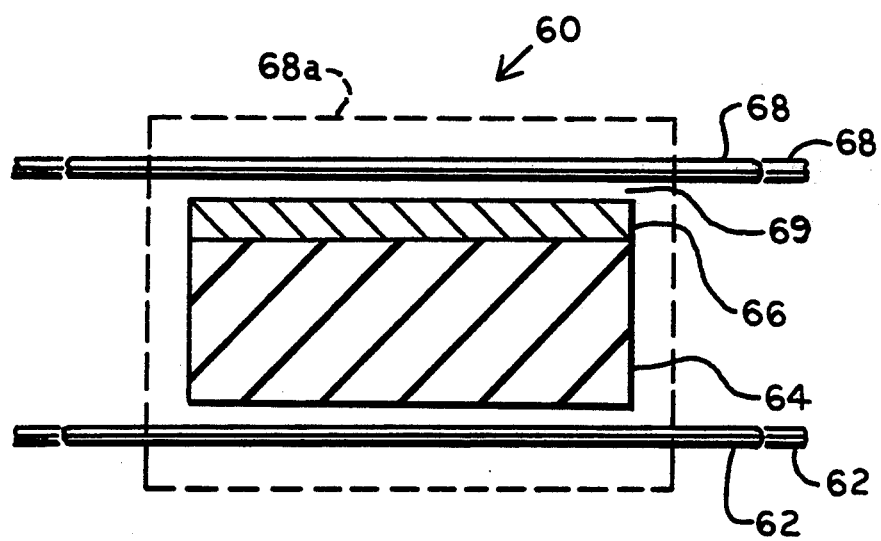
FIG. 4 is a schematic representation of the same, as viewed from the side.

Reference is now made to FIGS. 3 and 4, in which is shown a sensor for detecting water leaks, made in accordance with the principles of the present invention, and generally designated by the numeral 60.

The detector 60 comprises a buoyant, floatable, non-conductive block 64 having a conductive metal cap 66. A first pair of electrical probes 62 are disposed below the block 64, and a second pair 68 above the block. The second pair of probes 68 are separated from the metal cap 66 by an air gap 69. If a leak occurs in the vicinity of the detector 60, water will first contact the first pair of probes 62, closing an electrical circuit and activating alarms and valves as disclosed above. Should this first contact fail for any reason, a second electrical contact will be made as the rising water inside the containers 32 or 44 (FIG. 1) lift the block 64 until the metal cap 66 touches the second pair of probes 68. When this contact is made, an electrical circuit will be closed, activating the appropriate valves and alarms. In the unlikely event that both of these contacts fail, the second circuit would be closed when the rising water reaches the second pair of probes 68. Any of these events will lead to the proper valves and alarms being activated, thereby providing fail-safe protection for a home or building from water damage.

Preferably, the block 64 is made of foamed polystyrene ("stytrofoam"); and the probes 62, 68, and cap 66 of steel. Even more preferably, the entire water-detector 60 is enclosed by a plastic housing 68a.

Figure 5:
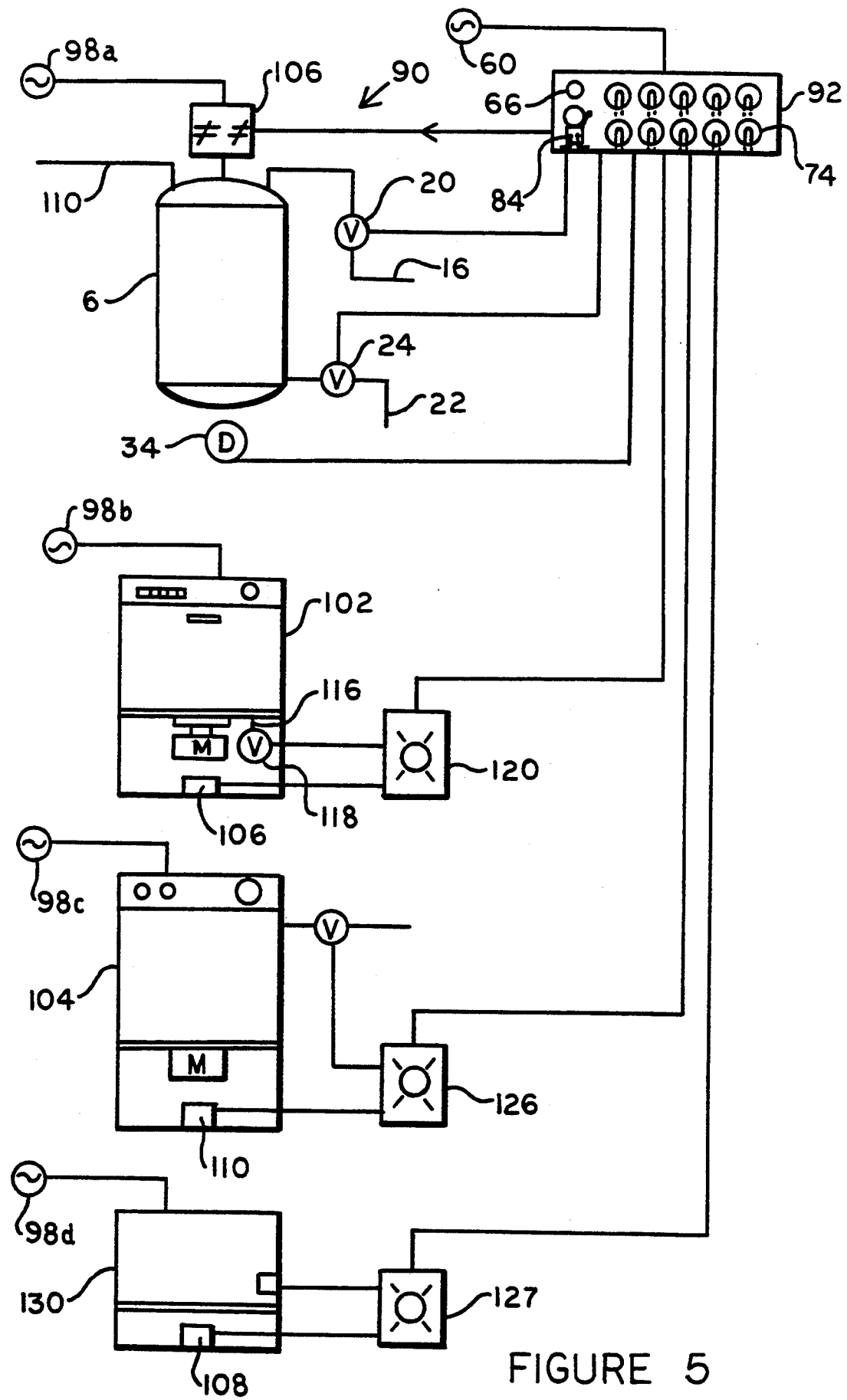
FIG. 5 is a schematic representation of a second assembly for preventing water damage due to water leakage in a home or building, the assembly being made in accordance with the principles of the present invention.

Reference is now made to FIG. 5, in which is shown the essential components of a second embodiment of a home-protection system made in accordance with the principles of the present invention, generally denoted by the numeral 90.

The system 90 comprises a monitor panel 92 for monitoring and controlling the system 90. Mounted on the panel 92 are an on-off switch 66, a plurality of incandescent lamps 74, and an audible alarm 84.

115 or 230 VAC power sources 98a, 98b, 98c, and 98d, provide electrical power for a hot-water tank 6, electrical dish-washer 102, electrical washing machine 104, and air-conditioner 130.

Power to the monitor panel 92 is provided by a 24 volt direct current (VDC) four-way bridge rectifier (not shown) connected to a 115-230 VAC power supply 60. A first water line 16 conducts water into the tank 6, and a second water line 110 discharges water out of the tank 6. The entry line 16 is equipped with a valve 20. A third water line 22 serves as a line for emptying the tank 6 to the outside environment. The third line 22 is equipped with a solenoid valve 24 which is activated by a water detector 34.

The dish-washer 102 is filled through a water line 116 having a valve 118, and is normally drained through a second water line (not shown). The valve 118 is activated by a relay box 120 disposed near the dish-washer 102. The valve 118 is closed in response to a signal from the relay box 120 indicating water detection by a water detector 106.

The washing machine 104 is monitored by a relay box 126 which closes a valve 128 in a water-supply line 129 if a water leak is detected by a water detector 110.

A water detector 108 is disposed proximate the air-conditioner 130, and communicates with a relay box 127. Detection of water by the detector 108 activates the relay box 127, which generates a visual alarm.

Figure 6A:
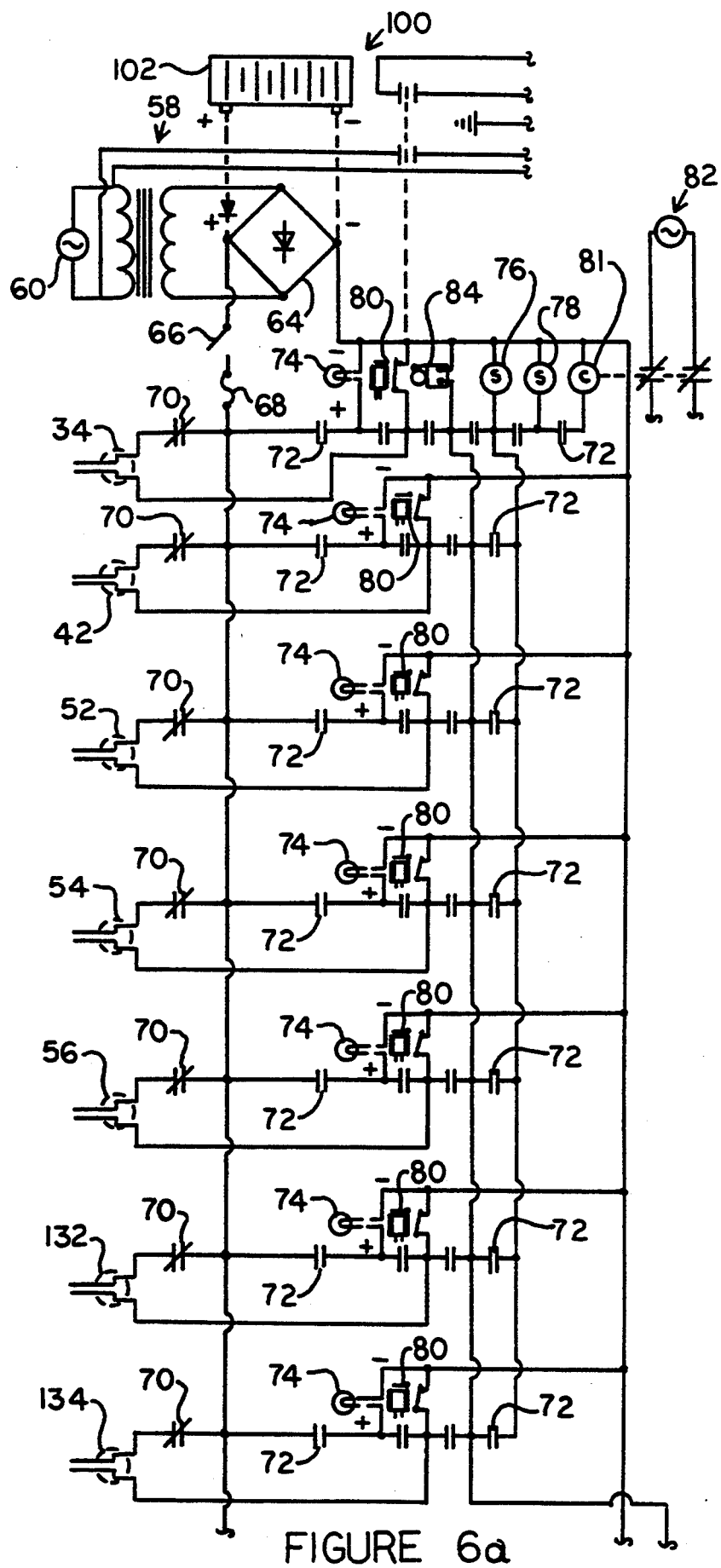
FIGS. 6a and 6b are a schematic wiring diagram for the assembly shown in FIG. 5, in accordance with the principles of the present invention.
Figure 6B:
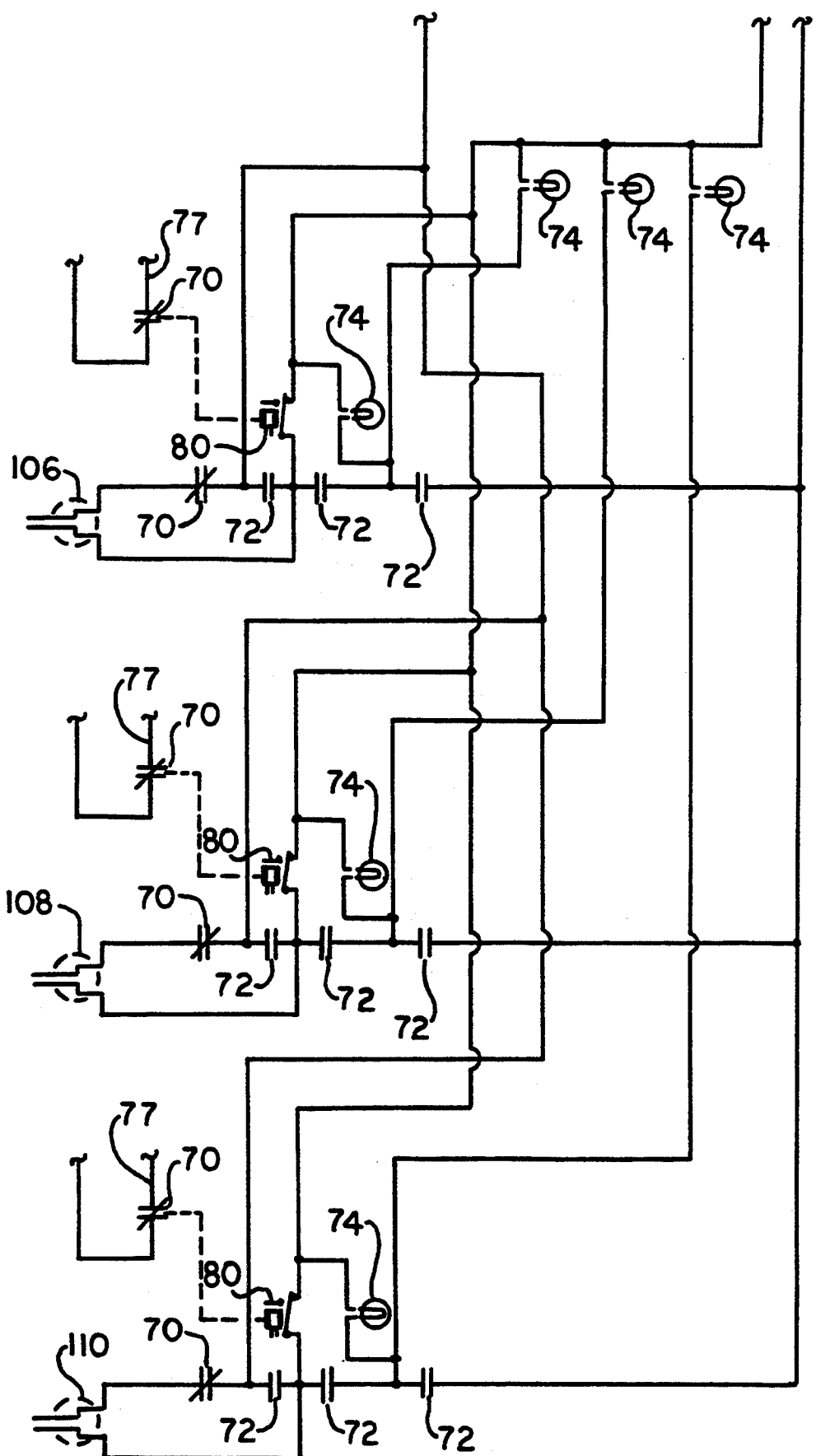

Reference is now made to FIGS. 6a and 6b, in which is shown a wiring diagram for the system 90, generally designated by the numeral 100. The electrical network 100 comprises a 24 VDC battery 102; a power source 58 comprising a 115-230 VAC to 24 VAC transformer 62, and a full-wave bridge rectifier 64; an on-off switch 66; a fuse 68; and a plurality of relay circuits connected to first, second, third, fourth, fifth, sixth, and seventh water detectors 34, 42, 52, 54, 56, 102, and 104, respectively.

Each relay circuit includes a relay 80, a normally-closed electrical contact 70, a plurality of normally-closed contacts 72, and an incandescent lamp 74.

The circuit for the first water detector 34 also includes an audible alarm 84, a coil 81, two solenoids 76 and 78, and a second normally-closed contact 70 connected to a source of electrical power 82. The coil 81 controls the second normally-closed contact 70 of the isolated AC circuit powered by the electrical source 82.

Each relay 80, solenoid 76, and solenoid 78 also includes a coil (not shown).

The incandescent lamps 74 are conveniently mounted on the monitor panel 92 as shown in FIG. 5.

The water detectors 34, 42, 52, 54, and 56 operate as shown in FIGS. 1 and 2 and as disclosed above. The water detector 108 is used to monitor the air-conditioner 130 (FIG. 5).

The detectors 34, 42, 52, 54, 56, 106, 108, and 110 are disposed proximate to the individual applicances and tanks 6, 8 (FIG. 1), 102, 130, and 110 which they monitor and control.

The incandescent lamps 74, audible alarm 84, coils 81, solenoids 76 and 78, contacts 70 and 72, switch 66, and fuse 68 shown in FIG. 6 function in the same way as the incandescent lamps 74, audible alarm 84, coils 81, solenoids 76 and 78, contacts 70 and 72, switch 66, and fuse 68 shown in FIG. 2. More specifically, an incandescent lamp 74 provides a visual alarm when the water detector 108 detects water leaking from the air-conditioner 130, thereby activating the relay box 127 (FIG. 5).

The water detectors 132 and 134 and their relay circuits are used to monitor any other electrical appliances as needed or desired.

We claim:

1. A fail-safe hot-water tank having a source for supplying water thereto, the fail-safe hot-water tank comprising:

(a) a tank for holding water;

(b) means for heating the contained water;

(c) a first passageway from the source of water to the tank;

(d) a first valve for keeping the first passageway open in the absence of detection of a water leak, and for keeping the passageway closed in response to the detection of a water leak from the tank;

(e) means for closing the first valve in response to the detection of a water leak from the tank, thereby shutting off the supply of water to the tank;

(f) a second valve for draining water from the tank to the external environment in response to the detection of a water leak from the tank;

(g) a second passageway from the second valve to the external environment;

(h) means for disconnecting the heating means in response to the detection of a water leak from the tank, thereby discontinuing the heating of the contained water; and (i) a plurality of independent and repetetive means for detecting leakage of water from the tank, said detecting means being critically and sequentially dependent on differences of water level and so constructed and arranged that all of the independent and repetetive detecting means would have to fail in order for a leakage of water from the tank not to be detected, thereby providing and ensuring fail-safe leak detection.

2. A fail-safe hot-water tank having a source for supplying water thereto, the fail-safe hot-water tank comprising:
 (a) a tank for holding water;
 (b) means for heating the contained water;
 (c) a first passageway from the source of water to the tank;
 (d) a first valve for keeping the first passageway open in the absence of detection of a water leak, and for keeping the passageway closed in response to the detection of a water leak from the tank;
 (e) a second valve for draining water from the tank to the external environment in response to the detection of a water leak from the tank;
 (f) a second passageway from the second valve to the external environment; and
 (g) a water detector for detecting leakage of water from the tank, the detector comprising
 (h) a float having an electrically-conductive top;
 (i) a first pair of electrical conductors disposed below the float and connected in parallel to a relay which controls the first and second valves; and
 (j) a second pair of electrical conductors disposed directly above and spaced apart from the float's conductive top, and connected in parallel to the relay;
the individual conductors of each pair of conductors being spaced apart from one another to form an open circuit in the absence of a water leak; the distance separating the individual conductors of the second pair of conductors being less than the width of the conductive top of the float, to provide an open circuit in the absence of contact between the top and the second pair of conductors or between water and the second pair of conductors; whereby a first electrical circuit is closed by water contacting the first pair of conductors, thereby closing the first valve and the first passageway, opening the second valve to drain the tank, discharging the water from the tank to the external environment, and disconnecting the heating means for the tank; a second electrical circuit is closed by rising water raising the float to a level at which electrical contact is made between the second pair of conductors and the conductive top of the float, thereby closing the first valve, opening the second valve, and disconnecting the heating means, if these functions have not been performed in response to water contact with the first pair of conductors; and the second electrical circuit is closed by rising water contacting the second pair of conductors, thereby closing the second valve, opening the third valve, and disconnecting the heating means, if these functions have not been performed in response to electrical contact between the second pair of conductors and the conductive top of the float.

3. A fail-safe water tank for a toilet haing a source for supplying water thereto, the fail-safe water tank comprising:
 (a) a tank for containing water;
 (b) a first passageway from the source of water to the tank;
 (c) a first valve for keeping open the first passageway in the absence of detection of a water leak from the tank, and for closing the first passageway in response to the detection of a water leak from the tank;
 (d) means for closing the first valve in response to the detection of a water leak from the tank, thereby shutting off the supply of water to the tank;
 (e) a second valve for draining water from the tank to the external environment in response to the detection of a water leak from the tank;
 (f) a second passageway from the second valve to the external environment; and
 (g) a plurality of independent and repetetive means for detecting leakage of water from the tank, said detecting means being critically and sequentially dependent on differences of water level and so constructed and arranged that all of the independent and repetetive detecting means would have to fail in order for a leakage of water from the tank not to be detected, thereby providing and ensuring fail-safe leak protection.

4. A fail-safe water tank for a toilet having a source for supplying water thereto, the fail-safe water tank comprising:
 (a) a tank for holding water;
 (b) a first passageway from the source of water to the tank;
 (c) a first valve for keeping the first passageway open in the absence of detection of a water leak, and for keeping the passageway closed in response to the detection of a water leak from the tank;
 (d) a second valve for draining water from the tank to the external environment in response to the detection of a water leak from the tank;
 (e) a second passageway from the second valve to the external environment; and
 (f) a water detector for detecting leakage of water from the tank, the detector comprising
 (g) a float having an electrically-conductive top;
 (h) a first pair of electrical conductors disposed below the float and connected in parallel to a relay which controls the first and second valves; and
 (i) a second pair of electrical conductors disposed directly above and spaced apart from the float's conductive top, and connected in parallel to the relay;
the individual conductors of each pair of conductors being spaced apart from one another to form an open circuit in the absence of a water leak from the tank; the distance separating the individual conductors of the second pair of conductors being less than the width of the conductive top of the float, to provide an open circuit in the absence of contact between the second pair of conductors and the conductive top or water; whereby a first electrical circuit is closed by water contacting the first pair of conductors, thereby closing the first valve, opening the second valve, emptying the tank, and discharging the water from the tank to the external environment; a second electrical circuit is closed by rising water raising the float to a level at which electrical contact is made between the second pair of conductors and the conductive top of the float, thereby closing the first valve, opening the second valve, emptying the tank, and discharging the water to the external environment, if these functions have not been performed in response to water contact with the first pair of conductors; and the second electrical circuit is closed by rising water contacting the second pair of conductors, thereby closing the first valve, opening the second valve, emptying the tank, and discharging the water to the external environment, if these functions have not been performed in response to electrical contact between the second pair of electrical conductors and the conductive top of the float.

5. A fail-safe system for preventing water damage to a building or home which includes a hot-water tank and a water tank for a toilet, the hot-water tank including (a) a first tank for holding water; (b) means for heating the water contained in the first tank; (c) a source for supplying water to the first tank; and (d) a first passageway from the source of water to the first tank; the water tank for the toilet including (e) a second tank for containing water; (f) a source for supplying water to the second tank; and (g) a second passageway from the source of water to the second tank; the damage-prevention system comprising:

(h) a first valve for keeping the first passageway open in the absence of detection of a water leak, and for closing the first passageway in response to the detection of a water leak from the first tank;

(i) a second valve for draining the first tank to the external environment in response to the detection of a water leak from the first tank;

(j) a third passageway from the second valve to the external environment;

(k) means for disconnecting the heating means in response to the detection of a water leak from the first tank, thereby discontinuing the heating of the first tank;

(l) a third valve for keeping the second passageway from the source of water to the second tank open in the absence of detection of a water leak from the second tank, and for closing the second passageway in response to the detection of a water leak from the second tank;

(m) a fourth valve for draining the second tank to the external environment in response to the detection of a water leak from the second tank;

(n) a fourth passageway from the fourth valve to the external environment; and (o) a first water detector for detecting water leakage from the first tank, the detector comprising (p) a first float having an electrically-conductive top;

(q) a first pair of electrical conductors disposed below the first float and connected in parallel to a first relay which controls the first and second valves; and (r) a second pair of electrical conductors disposed directly above and spaced apart from the first float's conductive top, and connected in parallel to the first relay;

(s) a second water detector for detecting water leakage from the second tank, the detector comprising (t) a second float having an electrically-conductive top;

(u) a third pair of electrical conductors disposed below the second float and connected in parallel to a second relay which controls the third and fourth valves; and (v) a fourth pair of electrical conductors disposed directly above and spaced apart from the second float's conductive top, and connected in parallel to the second relay;

the individual conductors of each pair of conductors being spaced apart from one another to form an open circuit in the absence of the detection of a water leak; the distance separating the individual conductors of the second and fourth pair of conductors being less than the widths of the conductive tops of the first and second floats, respectively, to provide an open circuit in the absence of a water leak; whereby a first electrical circuit is closed by water contacting the first pair of conductors, thereby closing the first valve and the first passageway, opening the second valve to drain water from the first tank, disconnecting the heating means for the first tank, and discharging the water from the first tank to the external environment; a second electrical circuit is closed by rising water raising the first float to a level at which electrical contact is made between the second pair of conductors and the conductive top of the first float, thereby closing the first valve, opening the second valve, disconnecting the heating means, and discharging water from the first tank, if these functions have not been performed in response to water contact with the first pair of conductors; the second electrical circuit is closed by rising water contacting the second pair of conductors, thereby closing the first valve, opening the second valve, disconnecting the heating means, and discharging water from the first tank, if these functions have not been performed in response to electrical contact between the second pair of conductors and the conductive top of the first float; a third electrical circuit is closed by water contacting the third pair of conductors, thereby closing the third valve and the second passageway, opening the fourth valve to drain water from the second tank, and discharging the water from the second tank to the external environment; a fourth electrical circuit is closed by rising water raisin the second float to a level at which electrical contact is made between the fourth pair of conductors and the conductive top of the second float, thereby closing the third valve, opening the fourth valve, and discharging the water from the second tank if these functions have not been performed by water contacting the third pair of conductors; and the fourth electrical circuit is closed by rising water contacting the fourth pair of conductors, thereby closing the third valve, opening the fourth valve, and discharging the water from the second tank if these functions have not been performed in response to electrical contact between the fourth pair of conductors and the conductive top of the second float.

6. A home-protection system, comprising:
(a) a hot-water tank;
(b) a cold-water tank which supplies water to a toilet;
(c) an electrical dish-washer;
(d) an electrical washing machine;
(e) an air-conditioner;
(f) a first water detector disposed proximate the hot-water tank;
(g) a second water detector disposed proximate the cold-water tank;
(h) a third water detector disposed proximate the dish-washer;
(i) a fourth water detector disposed proximate the washing machine;
(j) a fifth water detector disposed proximate the air-conditioner;
(k) a first water line leading from the hot-water tank to the exterior environment;
(l) a second water line leading from the cold-water tank to the external environment;
(m) a third water line for supplying water to the dish-washer;

(n) a fourth water line for supplying water to the washing machine;

(o) a first valve disposed in the first water line, the first valve being activated to open in response to detection of water by the first water detector, thereby draining the hot-water tank to the outside environment;

(p) a second valve disposed in the second water lined the second valve being activated to open in response to detection of water by the second water detector, thereby draining the cold-water tank to the outside environment;

(q) a third valve disposed in the third water line, the third valve being activated to close in response to the detection of water by the third water detector, thereby cutting off the supply of water to the dishwasher;

(r) a fourth valve disposed in the fourth water line, the fourth valve being activated to close in response to the detection of water by the fourth water detector, thereby shutting off the water supply to the washing machine; and (s) an incandescent lamp being electrically powered in response to the detection of water by the fifth water detector, thereby providing a visual alarm indicating a water leak from the air-conditioner;

each of the first, second, third, fourth, and fifth water detectors comprising:

(t) a float having an electrically-conductive top;

(u) a first pair of electrical conductors disposed below the float; and (v) a second pair of electrical conductors disposed directly above and spaced apart from the float's conductive top;

the individual conductors of each pair of conductors being spaced apart from one another to form an open circuit in the absence of the detection of a water leak, the distance separating the individual conductors of the second pair of conductors being less than the width of the conductive top of the float, to provide an open circuit in the absence of a water leak, whereby a first electrical circuit is closed by water contacting the first pair of conductors, a second electrical circuit is closed by rising water raising the float to a level at which electrical contact is made between the second pair of conductors and the conductive top of the float, and the second electrical circuit is closed by rising water contacting the second pair of conductors.

* * * * *